United States Patent [19]

Hou

[11] Patent Number: 4,985,883
[45] Date of Patent: Jan. 15, 1991

[54] APPARATUS FOR IMPARTING SOUND AND MOVEMENT TO AN ORNAMENT

[76] Inventor: Jack Hou, P.O. Box 78-95, Taipei, Taiwan

[21] Appl. No.: 204,514

[22] Filed: Jun. 9, 1988

[51] Int. Cl.$^5$ ............................................. G11B 31/00
[52] U.S. Cl. ................................... 369/69; 446/299; 446/302; 446/353
[58] Field of Search .............. 446/297, 299, 302, 353; 242/197, 198, 199; 360/91, 92, 93, 96.5, 132; 369/69

[56] References Cited

U.S. PATENT DOCUMENTS

| | | | |
|---|---|---|---|
| 546,912 | 9/1895 | Boettcher | 40/415 |
| 1,138,478 | 5/1915 | Hirsch | 369/69 X |
| 1,185,559 | 5/1916 | Vaughan | 369/69 X |
| 1,358,768 | 11/1920 | Maisano | 272/31 R |
| 1,360,659 | 11/1920 | Maisano | 272/31 R |
| 1,512,283 | 10/1924 | Fritsche | 369/69 X |
| 1,635,108 | 7/1927 | Bluthardt | 272/48 |
| 3,125,826 | 3/1964 | Ostrander | 446/301 |
| 3,279,793 | 10/1966 | Lakin | 272/31 R |
| 3,311,316 | 3/1967 | Williams | 360/132 X |
| 3,477,169 | 11/1969 | Gardel et al. | 446/301 |
| 3,498,603 | 3/1970 | Lakin | 272/31 R |
| 3,554,463 | 1/1971 | Emmasingel | 242/199 |
| 3,612,541 | 10/1971 | Huber | 360/93 |
| 3,685,200 | 8/1972 | Noll | 446/299 |
| 3,846,834 | 11/1974 | Nakamori | 360/93 |
| 3,909,845 | 9/1975 | Rothlisberger et al. | 360/93 X |
| 3,916,442 | 10/1975 | Dattilo et al. | 360/132 X |
| 3,917,283 | 11/1975 | Yahase et al. | 369/69 |
| 3,972,073 | 7/1976 | Bara | 360/93 |
| 3,996,618 | 12/1976 | Suzuki | 360/93 X |
| 4,050,342 | 9/1977 | Suzuki et al. | 84/95.2 |
| 4,303,955 | 12/1981 | Kramer et al. | 360/96.5 X |
| 4,368,494 | 1/1983 | Kamimura et al. | 360/93 X |
| 4,545,775 | 10/1985 | Kim | 446/299 |
| 4,708,689 | 11/1987 | Hou | 446/301 |

FOREIGN PATENT DOCUMENTS 248311 6/1912 Fed. Rep. of Germany .
298766 7/1954 Switzerland .

Primary Examiner—Aristotelis M. Psitos
Assistant Examiner—David L. Robertson
Attorney, Agent, or Firm—Bacon & Thomas

[57] ABSTRACT

An ornament is supported and moved by an apparatus which also includes a cassette tape player for providing accompanying sound.

1 Claim, 3 Drawing Sheets

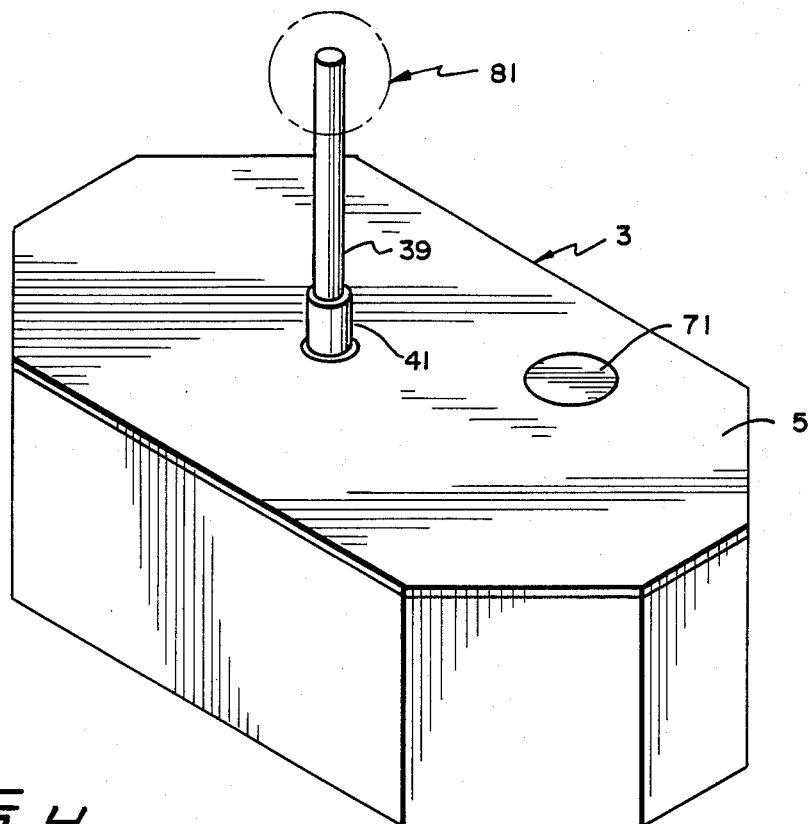
FIG. 4
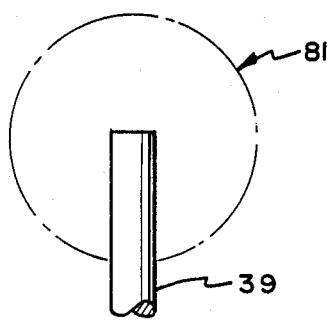
FIG. 5
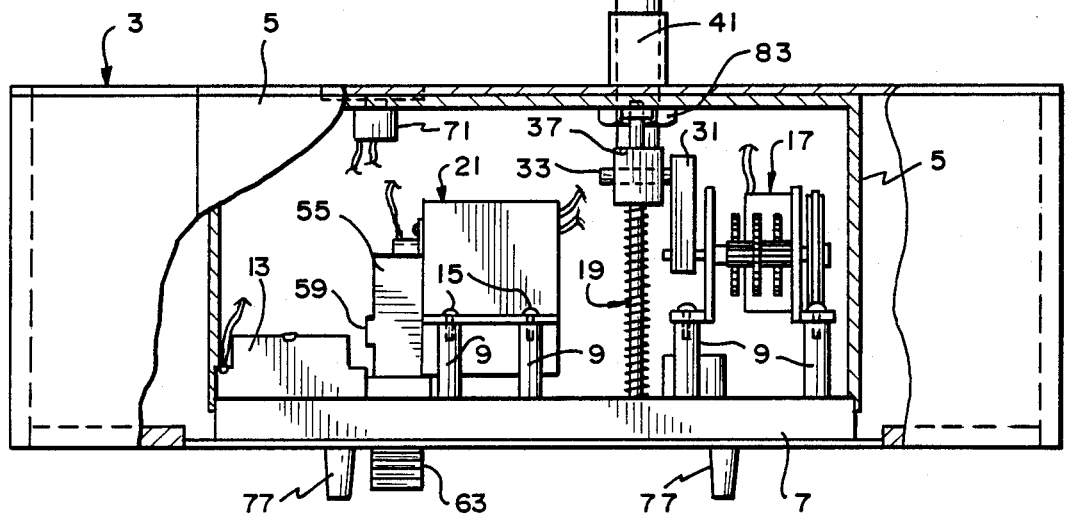

APPARATUS FOR IMPARTING SOUND AND MOVEMENT TO AN ORNAMENT

BACKGROUND OF THE INVENTION

1. Field of the Invention

The present invention generally involves the field of technology pertaining to animated ornaments. More specifically, the invention relates to an apparatus for simultaneously imparting movement and providing accompanying sound, such as music, to the moving ornament.

2. Description of the Prior Art

It is well known to provide a music box wherein an animated ornament is directly connected to the music producing mechanism so that a corresponding movement is impared to the ornament during playing of the music. Such a device conventionally utilizes a mechanical wind-up type of music box or a music box which is powered by an electrically-driven motor. In either case, an appropriate power transmission mechanism is required to convert the power output from the music box to a corresponding mechanical movement of the ornament.

Known devices of this type are considerably limited in the type and variety of accompanying sound to be associated with the animated ornament. It is generally only possible to provide a single sound source, such as a selected song, for each device. Thus, it is not possible to easily change the accompanying sound source without major alteration to the basic music and mechanical drive mechanism.

SUMMARY OF THE INVENTION

It is an object of the invention to provide an improved apparatus for both imparting movement to an animated ornament and providing music accompanying the movement.

It is another object of the invention to provide an improved apparatus for providing music accompanied movement to an ornament wherein the music source may be selectively changed or varied by the user.

It is another object of the invention to provide a fully self-contained apparatus for simultaneously imparting movement to an ornament and providing accompanying music to the movement.

These and other objects of the invention are realized by providing an apparatus which is essentially defined by a housing assembly that includes a casing for enclosing a power drive source, a power transmission mechanism, a tape cassette player and an electric power source supported on a base, with the base being further provided with an insertion channel accessible from the bottom thereof for selectively inserting and removing tape cassette cartridges to be played by the cassette player. The components are disposed in an electric circuit connection with each other, with a switch means being disposed within the circuit and supported on the casing to permit the simultaneous activation or deactivation of both the power drive source and cassette player.

Other objects, features and advantages of the invention shall become apparent from the following detailed description of a preferred embodiment thereof, when considered in conjunction with the drawings wherein like reference characters refer to corresponding parts in the several views.

BRIEF DESCRIPTION OF THE DRAWINGS

FIG. 4 is a perspective view of the exterior of the housing assembly shown with an ornament, represented in phantom line, supported on the tappet rod.

FIG. 5 is a side elevational view, partly broken away, of the housing assembly shown with all components disposed therein, and including a tape cassette in engagement with the cassette player.

DETAILED DESCRIPTION OF THE PREFERRED EMBODIMENT

Figure 1:
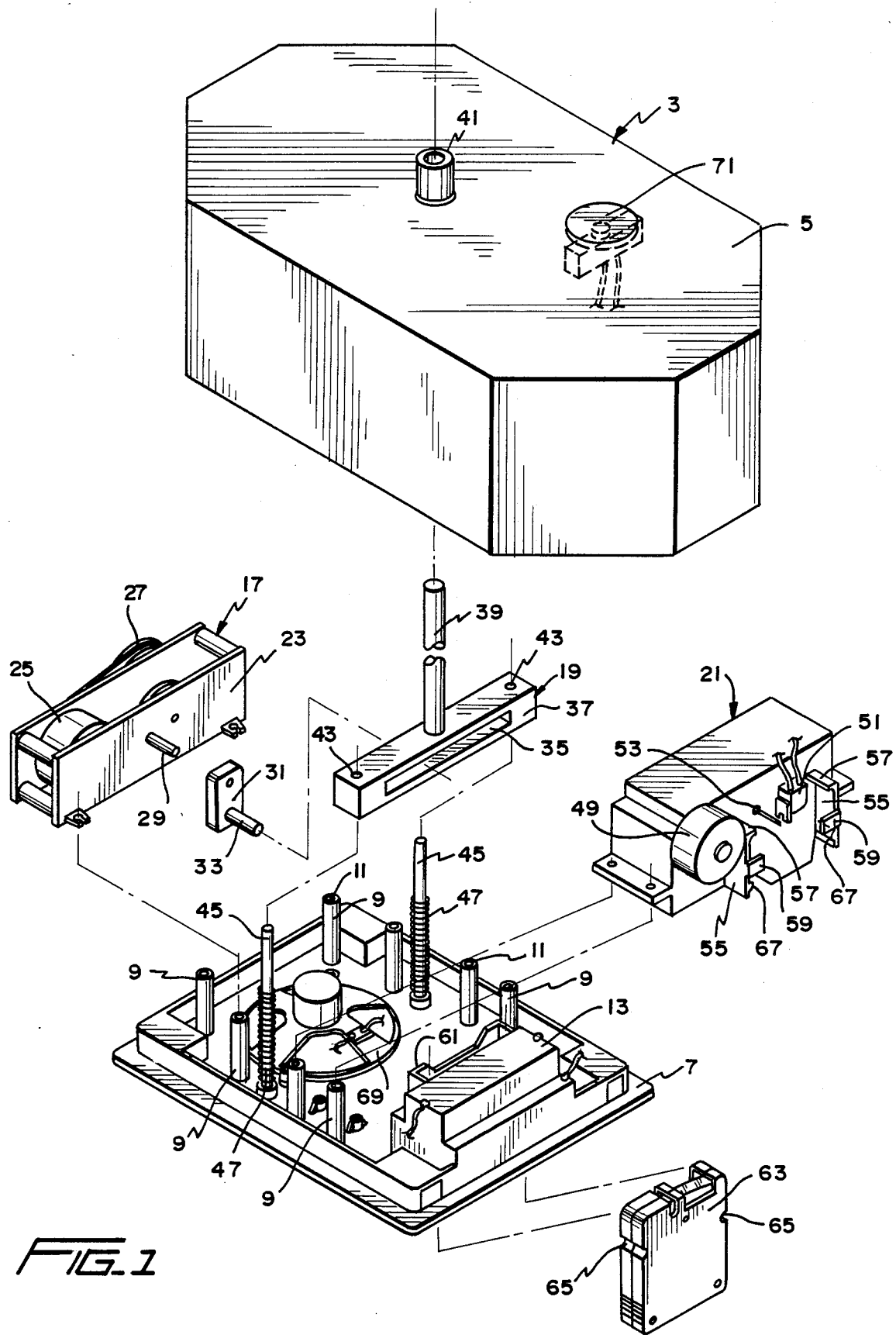
FIG. 1 is an exploded perspective view, partly in section, showing an apparatus according to a preferred embodiment of the invention.

An apparatus 1, according to a preferred embodiment of the invention, shall now be described with initial reference to FIG. 1. As shown therein, apparatus 1 includes a housing assembly 3 which is defined by a hollow casing 5 of any desired configuration and a corresponding base 7 which is configured for interengagement with the lower portion of casing 5. Base 7 is preferably molded from plastic and provided with a plurality of vertically extending mounting stubs thereon, with each stub 9 being preferably of a cylindrical configuration and provided with an internally threaded longitudinal socket 11 therein. Base 7 also includes an associated power supply case 13, which is preferably integrally formed therewith, for containing an appropriate electric power source, such as batteries.

Figure 2:
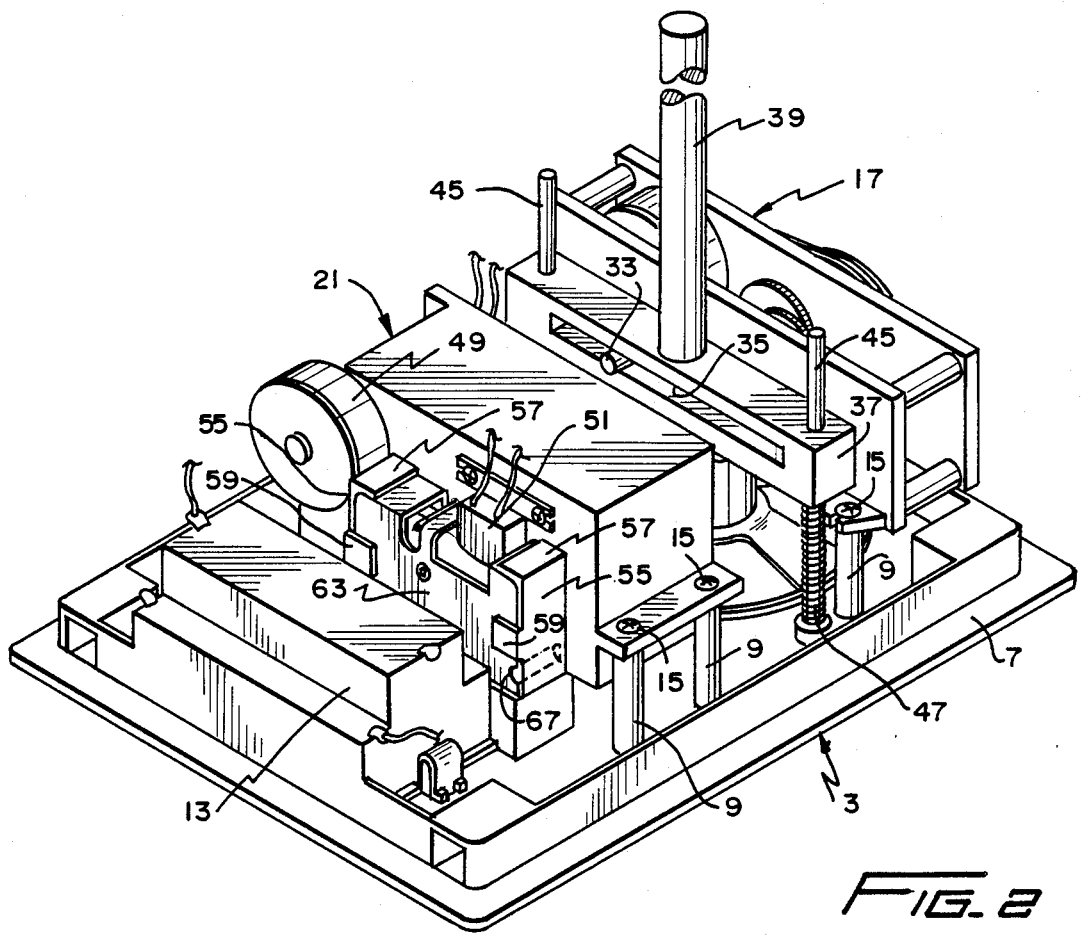
FIG. 2 is a perspective view, partly in section, showing the base of the housing assembly with the components mounted thereon, including a tape cassette disposed in engagement with the tape cassette player.

Apparatus 1 includes three basic components which are mounted on stubs 9 by the use of screws 15 which are engaged within threaded sockets 11 of stubs 9, as more particularly shown in FIG. 2. These components include a power drive source 17, a transmission mechanism 19 and a tape cassette player 21.

Power drive source 17 includes a frame 23 on which are mounted an electric motor 25, a pulley and gear assembly 27 and a power output shaft 29. Drive source 17 is comprised of conventional components and therefore may be of any appropriate configuration deemed suitable for the practice of the invention as disclosed herein.

Transmission mechanism 19 may include a cam lobe 31 engageable with output shaft 29 and provided with an eccentrically disposed cam element 33 that is in turn engaged within a slot 35 of an elongate follower arm 37. A vertically extending tappet rod 39 is supported on arm 37 and is slidably journalled through casing 5 by a guide sleeve 41 secured thereto. Arm 37 is also provided with a pair of passageways 43 at the opposite end thereof for slidably supporting arm 37 on a pair of corresponding guide rods 45 secured to base 7. Each rod 45 may also include a coil spring 47 thereon for imparting vertical bias to arm 37 and associated rod 39.

Tape cassette player 21 may be of conventional configuration and essentially includes a tape drive motor 49, a playback head 51 and a tape drive shaft 53. In addition to these conventional features, player 21 is also provided with another feature which forms a part of the invention, which feature includes a pair of outwardly extending flanges 55, with each flange 55 including an inwardly directed stop lip 57 and an inwardly directed guide lip 59. Flanges 55 and their associated lips 57 and 59 are preferably formed from flexible plastic and collectively define a channel-shaped recess which corresponds in size and configuration to and forms an extension of a cassette channel 61 formed in base 7, as shown in FIG. 1. Thus, when player 21 is secured in position on base 7, channel 61 is aligned with flanges 55 to guide and terminate the insertion of a tape cassette 63 into playing engagement with player 21, as shown in FIG. 2. As also seen in FIG. 1, cassette 63 is provided with a pair of grooves 65 on opposite edges thereof for receiving engagement by a pair of corresponding ribs 67 carried by flanges 55, thereby permitting a positive snap-fit engagement of cassette 63 into playing engagement with playback head 51 and tape drive shaft 53 of player 21.

As also shown in FIG. 1, base 7 is provided with an appropriate transducer 69, in the form of a downwardly firing loudspeaker or similar device, for cassette player 21. A switch means 71, preferably of a conventional depressible type, is mounted on casing 5 for simultaneously activating or deactivating the components of apparatus 1.

Figure 3:
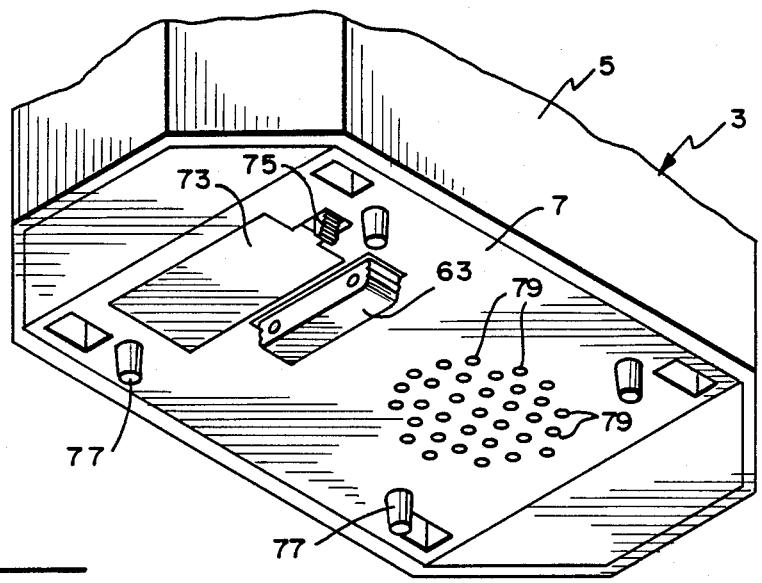
FIG. 3 is a partial perspective view of the bottom of the housing assembly, showing a tape cassette fully inserted within the cassette channel.

As seen in FIG. 3, the lower portion of case 13 is provided with a removable bottom panel 73 which is secured by a conventional latch 75 to permit access to the interior of case 13 for inserting or removing batteries. Base 7 is also provided with a plurality of feet 77 which raises housing assembly 3 a sufficient height off a supporting surface so as to clear the exposed edge of tape cassette 63, shown in its fully inserted position. A plurality of perforations 79 are also formed through base 7 for permitting the transmission of sound therethrough from speaker 69. Base 7 may be secured to the lower portion of casing 5 in any appropriate manner, such as through a snap-fit engagement or by the use of suitable mechanical fasteners.

With reference to FIGS. 4 and 5, tappet rod 39 extends vertically from the top of casing 5 when housing assembly 3 is secured together, and all components are secured and disposed therein in mechanical and electrical connection with each other. An ornament, shown generally at 81 is secured to rod 39 so that any movement of rod 39 shall impart a corresponding movement to ornament 81. Guide sleeve 41 is preferably provided with a threaded portion which extends into casing 5 and is secured thereto by means of a nut 83. The electrical connections between the batteries (not shown) contained within case 13, switch 71, cassette player 21 and its associated speaker 69, and power drive source 17 may be accomplished in a conventional manner, with the electric circuit being of such configuration so as to permit the simultaneous activation and deactivation of drive source 17 and cassette player 21 by the operation of switch 71.

The operation of apparatus 1, as depicted in FIG. 5, requires disposition of tape cassette 63 within the cassette player 21 in the manner previously described wherein the tape contained within cassette 63 is disposed in playback engagement with playback head 51 and in driving engagement with tape drive shaft 53, both of which engagements are positively secured through the engagement of ribs 67 within grooves 65 of cassette 63. Upon the simultaneous activation of cassette player 21 and power drive source 17 through the operation of switch 71, music or other sound source provided by cassette 63 is transmitted through speaker 69. Simultaneously, rotation of cam lobe 31 by power output shaft 29 of drive source 17 shall cause tappet rod 39 to reciprocate vertically within guide sleeve 41, thereby imparting a corresponding movement to ornament 81. The movement of ornament 81 is therefore accompanied by appropriate music played through speaker 69. Different songs or sounds may be used to accompany the movement of ornament 81 by merely selecting and inserting a desired cassette 63.

It is to be understood that the form of the invention herein shown and described is to be taken as a preferred embodiment thereof, and that various changes in shape, material, size and arrangement of parts may be resorted to without departing from the spirit of the invention or scope of the subjoined claims.

I claim:

1. An apparatus for imparting movement to an ornament and providing musical accompaniment to the movement comprising:
    (a) a hollow casing including an upper side and a bottom side;
    (b) a base including a top portion and a bottom portion, the base being secured to the bottom side of the casing, the top portion of the base and the interior of the casing collectively defining a compartment therebetween, and the bottom portion of the base including leg means for engaging a support surface and spacing the bottom portion therefrom;
    (c) an electric power drive source including an output shaft, a cam follower, a transmission mechanism including an eccentric cam means driven by the output shaft, a cam follower, and the eccentric cam means being disposed in driving engagement with the cam follower for imparting vertical movement thereto during operation of the power drive source when the leg means is in engagement with the support surface;
    (d) a tape cassette player supported on the top portion of the base, the bottom portion of the base including a channel disposed in alignment with the tape cassette player for receiving a tape cassette through the bottom portion and positioning the tape cassette in playing engagement with the tape cassette player;
    (e) an electric power supply for operating the power drive source and the tape cassette player;
    (f) switch means for activating and deactivating power drive source and tape cassette player; and
    (g) a tappet rod including a first end disposed interiorly of the casing and carried by the cam follower for imparting a corresponding vertical movement to the tappet rod during vertical movement of the cam follower, and a second end disposed exteriorly of the casing for mounting an ornament thereon, whereby vertical movement imparted to the tappet rod by the cam follower imparts a corresponding vertical movement to the ornament.

* * * * *